United States Patent
Chou et al.

(10) Patent No.: US 6,999,156 B2
(45) Date of Patent: Feb. 14, 2006

(54) TUNABLE SUBWAVELENGTH RESONANT GRATING FILTER

(76) Inventors: Stephen Y. Chou, 7 Foulet Dr., Princeton, NJ (US) 08540; Allan S. P. Chang, 228B Harrison La., Princeton, NJ (US) 08540; Hua Tan, 806 Fox Run Dr., Plainsboro, NJ (US) 08536; Jim Jiam Wong, 5923 Derick Dr., Orefield, PA (US) 18069; Wei Wu, Calderon Ave., Apt. 155, Mountain View, CA (US) 94041; Rich Zhaoning Yu, 9071 Mill Creek Rd., Apt. 1215, Levittown, PA (US) 19054

( * ) Notice: Subject to any disclaimer, the term of this patent is extended or adjusted under 35 U.S.C. 154(b) by 109 days.

(21) Appl. No.: 10/674,608

(22) Filed: Sep. 30, 2003

(65) Prior Publication Data

US 2005/0237475 A1    Oct. 27, 2005

Related U.S. Application Data

(60) Provisional application No. 60/415,048, filed on Sep. 30, 2002.

(51) Int. Cl.
*G02F 1/13* (2006.01)
(52) U.S. Cl. .......................................... 349/196; 385/37

(58) Field of Classification Search ................ 359/366, 359/318; 385/37; 349/201, 196
See application file for complete search history.

(56) References Cited

U.S. PATENT DOCUMENTS

| | | | |
|---|---|---|---|
| 5,299,289 A * | 3/1994 | Omae et al. ................ 349/201 |
| 5,598,300 A * | 1/1997 | Magnusson et al. ........ 359/566 |
| 6,118,586 A * | 9/2000 | Tanabe et al. .............. 359/566 |
| 6,215,928 B1 * | 4/2001 | Friesem et al. .............. 385/37 |
| 6,552,842 B1 * | 4/2003 | Simpson et al. ............ 359/318 |
| 6,661,952 B1 * | 12/2003 | Simpson et al. .............. 385/37 |

* cited by examiner

*Primary Examiner*—Robert H. Kim
*Assistant Examiner*—Phu Vu
(74) *Attorney, Agent, or Firm*—Polster, Lieder, Woodruff & Lucchesi L.C.

(57) ABSTRACT

In accordance with the invention, a tunable subwavelength resonant grating filter comprises a liquid crystal cell having a pair of major surface walls. One wall of the cell is a coated subwavelength grating of a SRGF. The coating comprises a polymer layer to fill the grating trenches and a surfactant layer to facilitate uniform alignment of the liquid crystal material. The refractive index of the LCD material in the cell can then be electrically or thermally adjusted to tune the resonant wavelength.

14 Claims, 3 Drawing Sheets

TUNABLE SUBWAVELENGTH RESONANT GRATING FILTER

CROSS REFERENCE TO RELATED APPLICATIONS

This application claims the benefit of U.S. Provisional Patent Application Ser. No. 60/415,048 filed by Stephen Y. Chou et al. on Sep. 30, 2002 and entitled "Optical Filters With Fixed and Tunable Frequency," which is incorporated herein by reference.

GOVERNMENT INTEREST

This invention was made with government support under DARPA contracts 341-6086 and 341-4131. The government has certain rights to this invention.

FIELD OF THE INVENTION

This invention relates to optical filters known as subwavelength resonant grating filters (SRGFs) and, in particular, to tunable SRGFs.

BACKGROUND OF THE INVENTION

Optical filters are key components in a wide variety of optical systems including optical telecommunications, optical displays and optical data storage. An optical filter is used to selectively reflect or transmit light of a predetermined wavelength. Typical uses include channel selection in wavelength division multiplexed (WDM) systems, multiplexers, demultiplexers, switches and wavelength selective laser cavity reflectors.

Subwavelength resonant grating filters (SRGFs) are highly promising for many optical filter applications. SRGFs typically comprise a linear array of grating lines overlying an optical waveguide. The spacing between successive grating lines is smaller than the wavelength of the light they process, hence they are called subwavelength gratings. They are highly reflective for light of a specific wavelength that resonates with the spaced grating lines. Further details concerning such filters can be found, for example, in U.S. Pat. No. 5,216,680 issued to Magnusson et al. on Jan. 1, 1993 and U.S. Pat. No. 5,598,300 issued to Magnusson et al. on Jan. 28, 1997, which are incorporated herein by reference.

While SRGF's are compact and highly reflective, they are typically fixed in resonant wavelength at their fabrication. Efforts have been made provide a tunable SRGF by disposing an electro-optic medium adjacent the grating. See U.S. Pat. No. 6,215,928 issued to A. Friesem et al. on Apr. 10, 2001. Unfortunately the Friessem et al structures do not perform sufficiently well for practical application. Accordingly, there is a need for an improved tunable subwavelength resonant grating filter.

SUMMARY OF THE INVENTION

In accordance with the invention, a tunable subwavelength resonant grating filter comprises a liquid crystal cell having a pair of major surface walls. One wall of the cell is a coated subwavelength grating of the filter. The coating fills the grating trenches to facilitate uniform alignment of the liquid crystal material. The refractive index of the LCD material in the cell can then be electrically or thermally adjusted to tune the resonant wavelength.

BRIEF DESCRIPTION OF THE DRAWINGS

The nature, advantages and various additional features of the invention will appear more fully upon consideration of the illustrative embodiments not to be described in connection with the accompanying drawings. In the drawings.

It is to be understood that these drawings are for purposes of illustrating the concepts of the invention and are not to scale.

DETAILED DESCRIPTION

Applicants have discovered that the grating structure in an LCD cell can prevent proper alignment of the liquid crystal material, interfering with proper functioning of an LCD tunable SRGF. This interference can be substantially eliminated by planarizing the grating, as by coating it with a polymer to fill the grating trenches.

Figure 1:
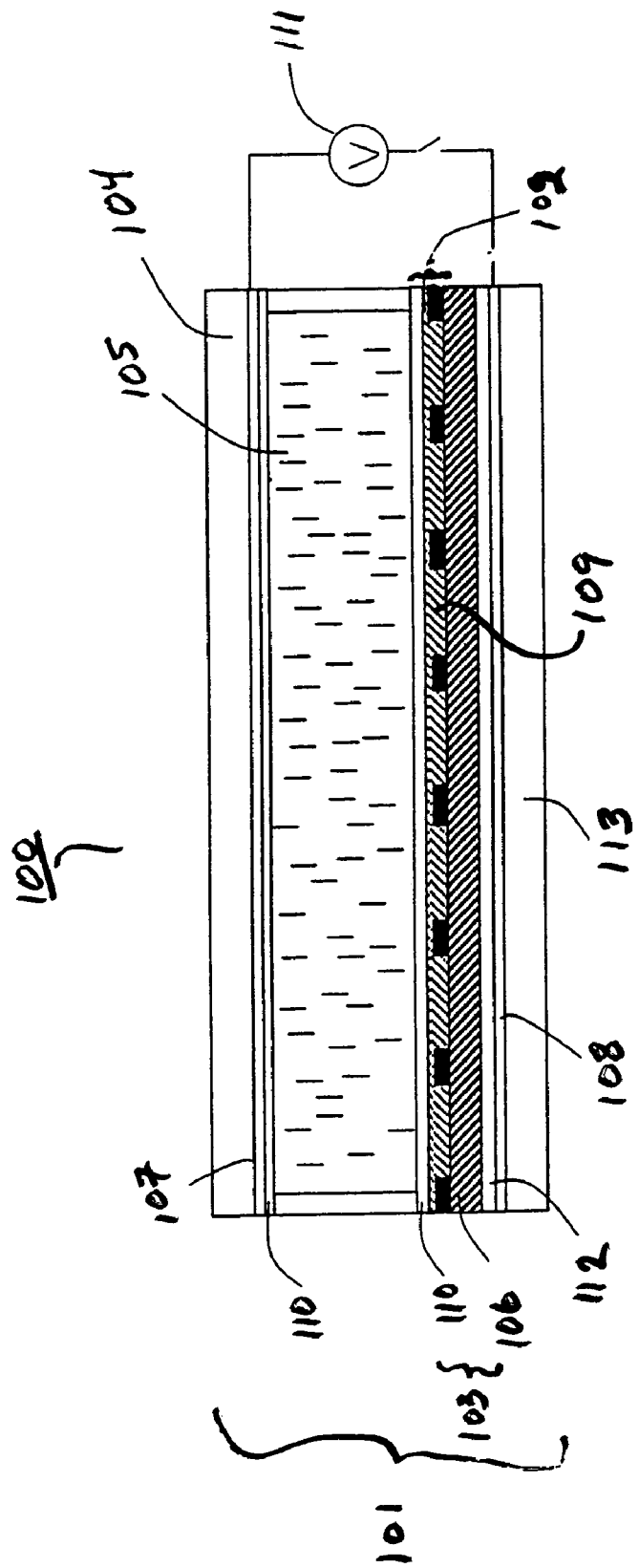
FIG. 1 is a schematic cross section of a tunable LCD SRGF in the field-off condition.

Referring to the drawings, FIG. 1 is a schematic cross section of a tunable subwavelength resonant grating filter 100 comprising, in essence, an LCD cell 101 having as one major surface wall a coated subwavelength grating 102 of a SRGF 103. The cell 101 comprises a second major surface wall 104 and is filled with LCD material 105. The SRGF comprises, in addition to the grating layer 102, a planar waveguide 106 parallel to the grating plane. In this embodiment, transparent electrodes 107 and 108 are disposed on opposite sides of the LCD material to permit voltage control of the LCD index of refraction. A polymer coating layer 109 fills the trenches in grating 102, and surfactant coatings 110 on the major cell wall surfaces are provided to permit alignment of the liquid crystal material (homeotropic alignment). A voltage source 111 between electrodes 107, 108 can control the index of the LCD material 105 and thus tune the resonant wavelength of the filter 100. Advantageously a cladding layer 112 separates the electrode 108 from the waveguide layer 106. The SRGF may conveniently be disposed on a transparent substrate 113.

The major surface walls 103, 104 comprise transparent dielectric materials such as glass. The grating layer 102 and the planar waveguide 106 are also transparent dielectric materials with the waveguide material having a higher index of refraction than the grating material. The grating itself can be patterned as a conventional linear array of parallel grating lines or as a two dimensional array of nanoscale diffraction elements with subwavelength spacing. The advantage of the two dimensional array grating is substantial polarization independence.

In a preferred embodiment, the cell wall 104 and the substrate 112 are comprised of glass, and the electrodes 107, 108 are advantageously deposited coatings of transparent conductor such as indium tin oxide (ITO). The SRGF preferably comprises a patterned silicon nitride ($SiN_x$) grating layer 102 deposited and patterned to work as a resonant filter on an $SiO_2$ waveguide layer 106. An appropriate polymer to fill the trenches is a polystyrene based resist (NP 60) and a compatibe surfactant is a silicone surfactant alignment agent such as ZLI 3334.

Figure 2:
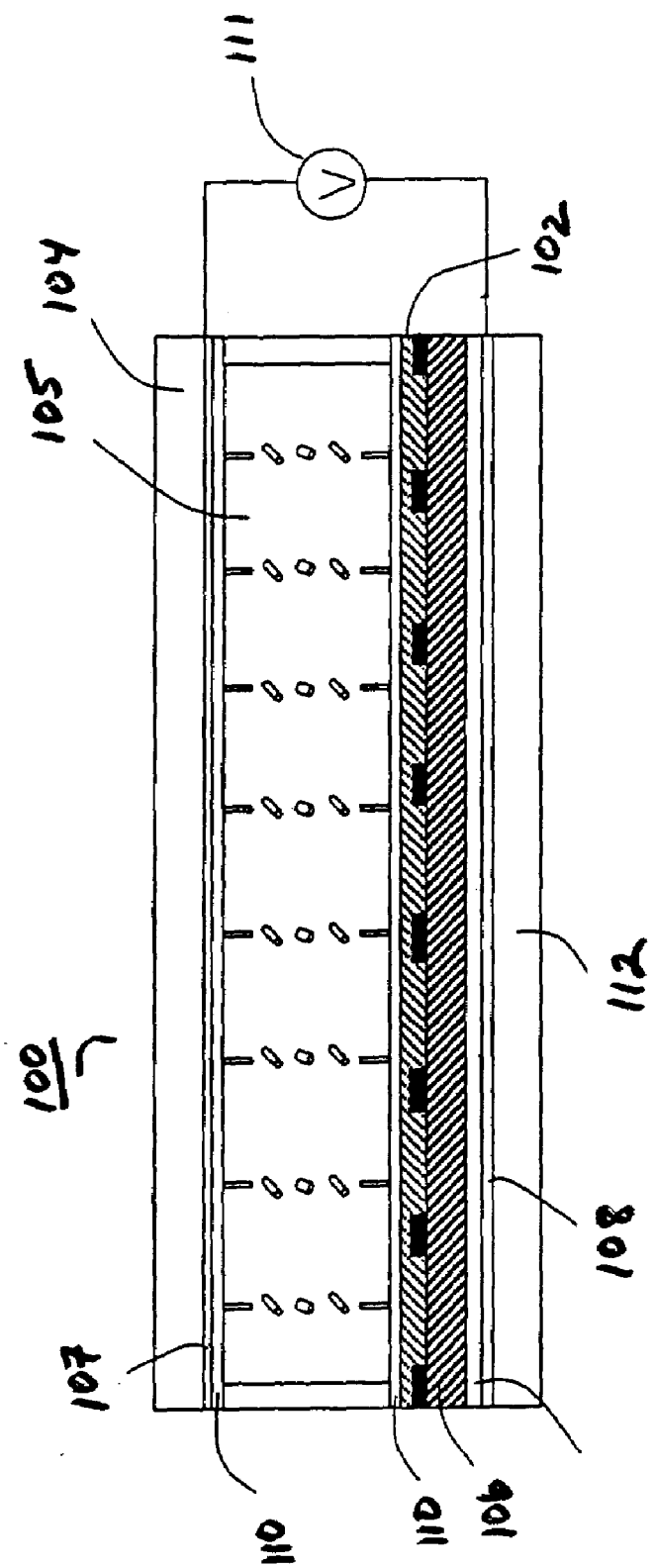
FIG. 2 shows the device of FIG. 1 in the large field condition.

The operation of the tunable SRGF can be understood by consideration of FIGS. 1 and 2 showing the device with different levels of electrical field strength between the electrodes 107,108. In FIG. 1, where no electrical field is applied, the liquid crystal molecules are aligned primarily by the effect of surfactant coatings 110. The LC material aligns parallel to the normal direction between the coatings 110. In this state, light entering the cell through either transparent cell wall experiences the minimum refractive index of the variable index LCD material.

FIG. 2 shows the cell in a field where the voltage is large. Here most of the liquid crystal molecules will rotate to a direction where the direction is perpendicular to the electric field. Only on the surface there is a thin layer of liquid crystal molecules with their directors parallel to the cell normal. In this condition light incident normal to the cell will experience the maximum refractive index of the LCD material during much of its passage through the cell. For field strengths intermediate zero and large, the light will experience intermediate indices. Since the working wavelength of the resonant grating depends on the refractive index of the LCD cell, the working wavelength of the filter can be tuned by the applied electrical field. Alternatively, the LCD index can be controlled thermally by an electrically powered heat source or magnetically by an electromagnet.

Figure 3:
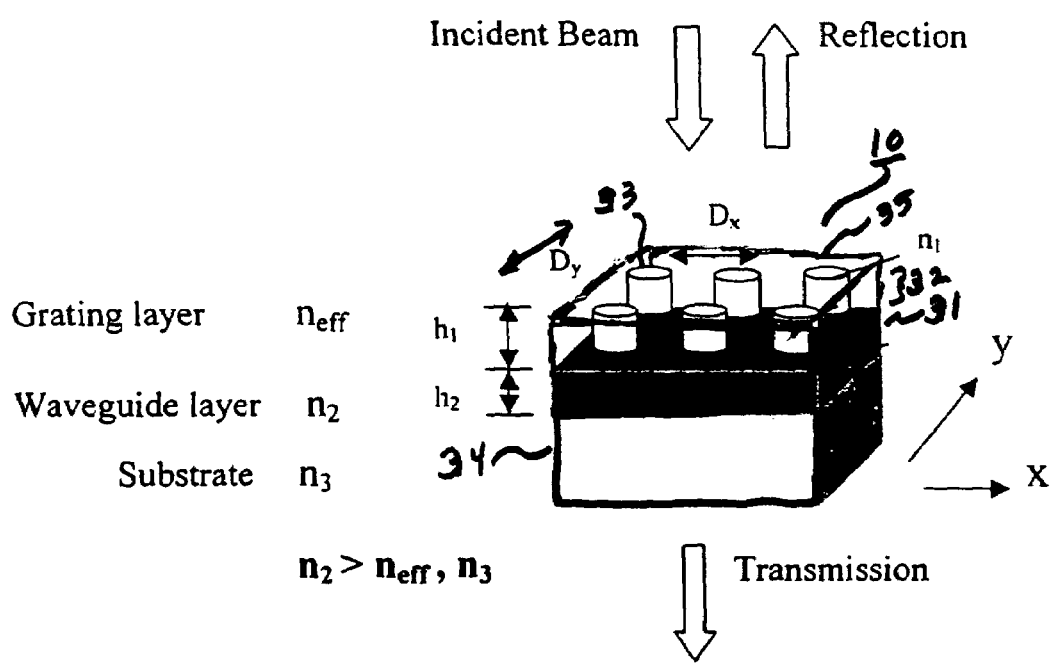
FIG. 3 is a schematic illustration of an advantageous SRGF for use in the tunable grating of FIG. 1.

FIG. 3 illustrates in greater detail the features of an advantageous SRGF for use in the tunable filter of FIGS. 1 and 2. The primary advantage of using the FIG. 3 SRGF is that the resulting tunable filter can be made polarization independent.

Referring to FIG. 3 the filter 30 comprises a waveguide layer 31 and a grating layer 32 adjacent the waveguide layer. The grating layer is patterned into a two-dimensional array of nanoscale diffraction elements 33. The array of elements 33 forms a two-dimensional grating structure that is periodic in two orthogonal directions (x,y). It has a period $D_x$ in the x-direction less than a wavelength of the light to be processed and a period $D_y$ in the y-direction less than a wavelength. The subwavelength periods $D_x$ and $D_y$ are preferably but not necessarily equal. The waveguide layer 31 can be conveniently formed overlying an optional substrate layer 34.

Each of the layers 31, 32, 34 advantageously comprises a transparent dielectric material. The waveguide layer index of refraction, $n_2$, should be greater than the grating layer effective index, $n_{eff}$, and greater than the substrate index, $n_3$.

The diffraction elements 33 (also referred to as grating elements) are advantageously circular pillars of nanoscale diameter, but could alternatively be nanoscale elements of other shape such as rectangular pillars, pyramids, cones or holes so long as the array exhibits subwavelength periodicity in two orthogonal directions. The diffraction elements are coated with a planarizing layer 35, such as a polymer, and the planarized surface is coated with a layer of surfactant (not shown).

In an exemplary device for light of 1.55 micrometer wavelength, the substrate can be glass, the waveguide layer $SiO_2$ and the grating layer composed of nanoscale diameter pillars of silicon nitride. Typical dimensions are: pillar diameter—100 to 600 nanometers; pillar height—20–200 nanometers; pillar spacing 200 nanometers to 1.2 micrometers. Alternatively, the device can be implemented in semiconductor materials such as InGaAsP/InP. Such devices can be readily fabricated using the nanoimprint lithographic techniques described in U.S. Pat. No. 6,482,742 (Nov. 19, 2002) and U.S. Pat. No. 5,772,905 (Jun. 30, 1998) which are incorporated herein by reference. The fabrication of such filters using nanoimprint techniques is described in applicants' U.S. patent application Ser. No. 10/674,607 filed contemporaneously herewith and entitled "Method of Making Subwavelength Resonant Grating Filter", which is incorporated herein by reference.

In operation, light is shone onto the filter 30, typically at normal incidence to the plane of the grating layer. Since the grating elements are arrayed with subwavelength spacing, the light will experience the grating layer as an effectively homogenous layer with an effective index $n_{eff}$, and, except for light at a certain resonant wavelength $\lambda_o$, the light will transmit through the device as if it were a thin-film structure.

For light at the resonant wavelength $\lambda_o$, the diffraction from the grating elements produces an evanescent wave along the x-y plane. The evanescent wave couples with a waveguide mode supported by the waveguide layer, propagating a waveguide mode within the waveguide layer. Due to the phase matching of the grating elements, the waveguide mode radiates energy transverse to the waveguide layer at a phase that interferes constructively with the reflection and destructively with the transmission. The result is that substantially all energy at $\lambda_o$ is reflected and substantially no energy $\lambda_o$ is transmitted.

An important advantage of this device is its polarization-independence. In conventional gratings with one-dimensional grating periodicity, only one polarization component of the light can be coupled into the waveguide at a resonant wavelength $\lambda_o$. This is due to the difference between the TE and TM modes in the waveguide are different. Thus conventional filters are polarization dependent and transmit some of the light at $\lambda_o$.

With the two-dimensional grating filters described herein, both polarization components can be coupled into two orthogonal directions due to the symmetry of the grating. Therefore the filters are polarization independent and substantially all light at $\lambda_o$ is reflected.

In designing such a filter for a particular application, the location of the resonant wavelength is determined primarily by the value of the grating period. In general, $\lambda_o = aD + b$, where $\lambda_o$ is the resonant wavelength, D is the grating period and a, b are constants.

The bandwidth of the filter is determined primarily by the thickness $h_1$ (FIG. 1) of the grating layer. In general, the Full-Width-Half-Maximum (FWHM) of the filter follows a quadratic relationship of the grating thickness. It is thus possible to obtain a very narrowband filter by using a very thin grating layer. For example, a sub-nanometer FWHM can be obtained with grating thickness less than 60 nanometers.

For use with light incidence other than normal, polarization-independence is achieved by grating periods that are different in two orthogonal directions.

The advantages of this tunable filter are manyfold. It is easy to fabricate, potentially low in cost and provides good performance. The free spectral range can be large, making the device highly advantageous for DWDM systems. The large E-O efficiency of LC materials permits achievement of a relatively large tuning range with relatively low voltages, and with the use of the FIG. 3 SRGF, the tunable filter can be polarization independent.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A tunable optical filter comprising:
   a subwavelength resonant grating filter comprising a subwavelength grating having a plurality of diffraction elements, and a planar waveguide layer adjacent and substantially parallel to said subwavelength grating;
   a planarized grating layer;
   a liquid crystal cell substantially filled with a liquid crystal material, said liquid crystal cell comprising a first surface wall comprised of said planarized subwavelength grating, and a second surface wall;
   a surfactant coating applied to said first and second surface walls of said liquid crystal cell; and
   means to control of the refractive index of said liquid crystal material, thereby tuning the filter.

2. The tunable optical filter according to claim 1 wherein said subwavelength grating comprises a two dimensional array of nanoscale diffraction elements having subwavelength spacing.

3. The tunable filter according to claim 1 wherein said plurality of diffraction elements exhibit subwavelength periodicity in two orthogonal directions.

4. The tunable optical filter according to claim 3 wherein said plurality of diffraction elements are circular pillars of nanoscale diameter.

5. The tunable optical filter according to claim 1 wherein said first and second surface walls comprise transparent dielectric material.

6. The tunable optical filter according to claim 1 wherein said subwavelength grating and said planar waveguide layer comprise transparent dielectric material and wherein said planar waveguide has a higher index of refraction than said subwavelength grating.

7. The tunable optical filter according to claim 1 wherein said subwavelength grating comprises a linear array of parallel grating lines.

8. The tunable filter of claim 1 wherein the means to control the refractive index of the liquid crystal material comprises a pair of electrodes disposed on opposite sides of said liquid crystal material.

9. The tunable filter of claim 1 wherein the planarized grating layer comprises a grating and a polymer disposed in the grating trenches.

10. The tunable optical filter according to claim 1 wherein said surfactant coating comprises silicone material.

11. The tunable optical filter according to claim 1 wherein said planar waveguide layer is supported by a substrate layer.

12. The tunable optical filter according to claim 8 wherein said first and second surface walls comprise glass, said electrodes comprise indium tin oxide, said subwavelength grating comprise patterned silicon nitride grating elements and said planar waveguide comprises silicon dioxide.

13. The tunable optical filter according to claim 9 wherein said polymer comprises polystyrene.

14. A tunable optical filter comprising:
   a subwavelength resonant grating optically coupled to a planar waveguide layer, the grating comprising a plurality of grating elements periodically spaced apart in an array and a material filling the spaces between successive grating elements to form a planarized grating surface;
   a liquid crystal cell filled with liquid crystal material optically coupled to the planarized grating surface; and
   a source of electrical energy coupled to the liquid crystal material to vary the refractive index of the liquid crystal material and thereby tune the optical filter.

* * * * *